US005299420A

United States Patent [19]

Devier et al.

[11] Patent Number: 5,299,420

[45] Date of Patent: Apr. 5, 1994

[54] REDUNDANT CONTROL SYSTEM FOR A WORK VEHICLE

[75] Inventors: Lonnie J. Devier, Dunlap; Stephen V. Lunzman, Chillicothe; John J. Krone, Dunlap; Howard A. Marsden, Pekin, all of Ill.

[73] Assignee: Caterpillar Inc., Peoria, Ill.

[21] Appl. No.: 66,634

[22] Filed: May 26, 1993

Related U.S. Application Data

[63] Continuation of Ser. No. 821,104, Jan. 15, 1992, abandoned.

[51] Int. Cl.5 .................... F16D 31/02; F15B 13/044

[52] U.S. Cl. .................... 60/403; 91/459; 60/484; 137/596.16; 137/596.17

[58] Field of Search .................... 91/459, 461; 60/325, 60/403, 484, 486; 137/596.16, 596.17; 371/8.1, 9.1; 364/187

[56] References Cited

U.S. PATENT DOCUMENTS

| | | | |
|---|---|---|---|
| 3,636,331 | 1/1972 | Amrehn | 364/187 |
| 4,133,027 | 1/1979 | Hogan | 364/187 |
| 4,141,066 | 2/1979 | Keiles | 364/187 X |
| 4,426,850 | 1/1984 | Reedy | 364/187 X |
| 4,504,905 | 3/1985 | Burrage | 371/9.1 X |
| 4,562,528 | 12/1985 | Baba | 364/187 X |
| 4,605,042 | 8/1986 | Zettergren | 137/596.16 X |
| 4,625,622 | 12/1986 | Gunda et al. | 91/459 X |
| 4,712,376 | 12/1987 | Hadank et al. | 60/484 X |
| 4,882,669 | 11/1989 | Miura et al. | 364/187 X |
| 4,959,768 | 9/1990 | Gerhart | 364/187 |
| 4,965,714 | 10/1990 | Knecht | 371/8.1 X |
| 5,014,261 | 5/1991 | Shinbashi et al. | 371/8.1 X |
| 5,073,774 | 12/1991 | Ikawa | 371/8.1 X |
| 5,136,498 | 8/1992 | McLaughlin et al. | 364/187 X |
| 5,148,364 | 9/1992 | Scherer | 371/8.1 X |
| 5,195,040 | 3/1993 | Goldsmith | 371/9.1 X |
| 5,202,822 | 4/1993 | McLaughlin et al. | 371/9.1 X |

FOREIGN PATENT DOCUMENTS

| | | | |
|---|---|---|---|
| 0178501 | 11/1982 | Japan | 364/187 |
| 0151742 | 9/1983 | Japan | 371/8.1 |

*Primary Examiner*—Edward K. Look
*Assistant Examiner*—John Ryznic
*Attorney, Agent, or Firm*—R. Carl Wilbur

[57] ABSTRACT

A control system is provided for use with a hydraulic system which includes a source of pressurized fluid, a plurality of flow regulator means, and a plurality of fluidly powered components. Each flow regulator means is adapted to receive the pressurized fluid and is responsive to a respective control signal for regulating the flow of pressurized fluid to respective fluidly powered components. The control system includes a plurality of control members, each being movable to a plurality of locations for indicating a desired fluid output for a respective flow regulator means. A plurality of sensors are provided for sensing the position of respective control members and responsively producing respective position signals. A primary controller is adapted to receive the position signals, process the received signals to responsively produce the control signals, and deliver the control signals to the flow regulator means. A secondary controller is normally disabled and is adapted to receive the position signals, process the position signals to responsively produce the control signals, and deliver the control signals to the flow regulator means. A first device is provided for controllably disabling the primary controller and enabling the secondary controller.

25 Claims, 4 Drawing Sheets

R
N
F
84a
84b
82a
82b
82c
82d
90a
90b
110
CONNECTOR
CONNECTOR
122
120
124
R N F R N F D N U D N U
123
94
92
PRIMARY CONTROLLER
126
128
102
SECONDARY CONTROLLER
100
96
104
CONNECTOR
112
CONNECTOR
38a
40a
42a
44a
42b
40b
44b
38b
14
28a
46a
46b
28b
32b
26b
32a
26a
22
20b
36
53
ENGINE
24
20a
50
18
12
10

3/4
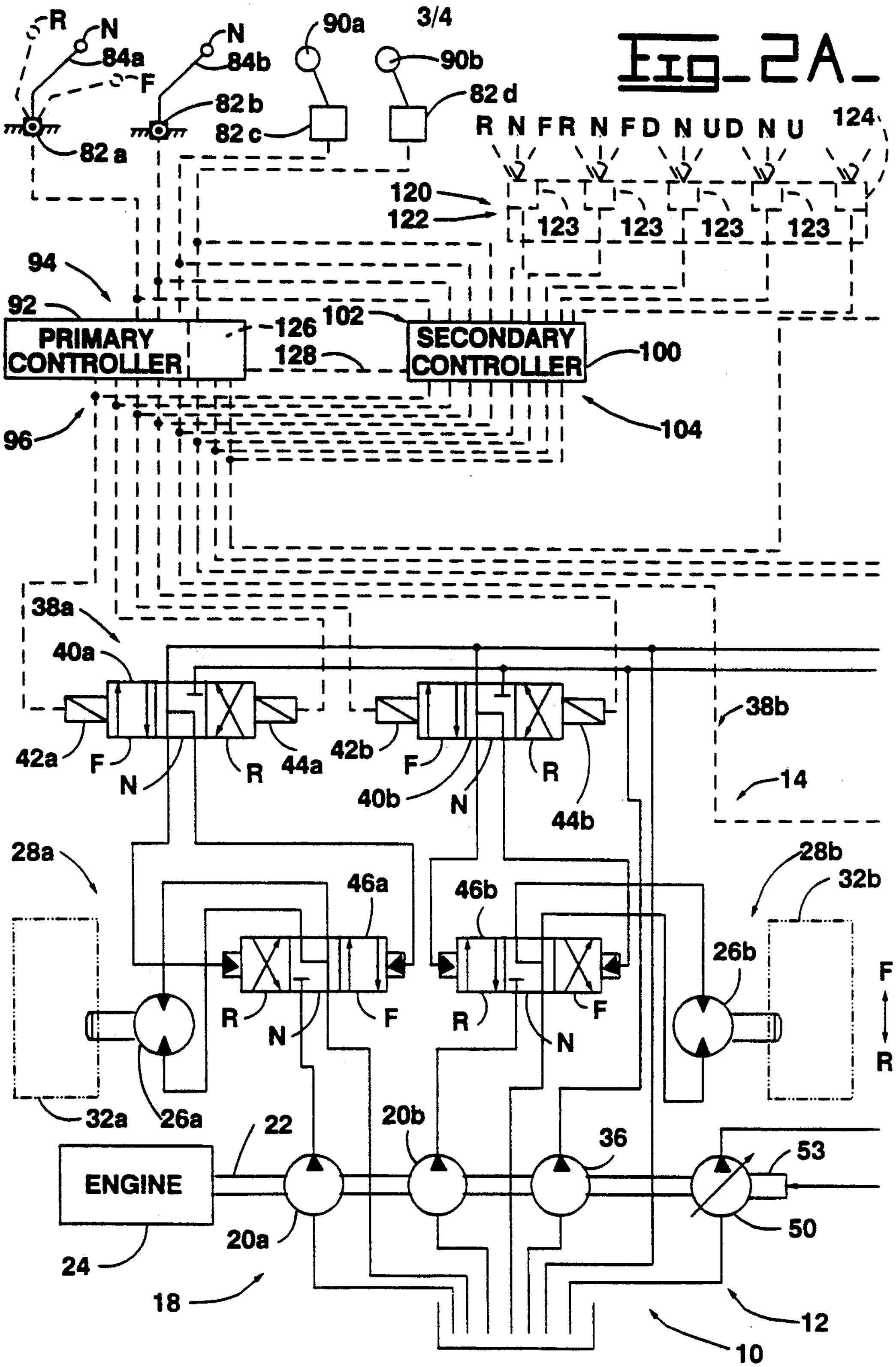

REDUNDANT CONTROL SYSTEM FOR A WORK VEHICLE

This is a continuation of application Ser. No. 07/821,104 filed Jan. 15, 1992 now abandoned.

DESCRIPTION

1. Technical Field

The present invention is directed towards a control system for a hydraulically powered vehicle and, more particularly, to a secondary control system which can be controllably activated for operating the vehicle when a fault occurs in a primary control system.

2. Background Art

In the past construction vehicles, such as track type tractors and excavators, typically employed hydromechanical control systems for regulating operation of the vehicle's drive system and implement systems.

Recently, the trend has been to replace the hydromechanical control systems with electro-hydraulic control systems. Electro-hydraulic systems are advantageous over conventional hydro-mechanical systems because of the reduced cost, increased flexibility and improved responsiveness which is achieved. Early electro-hydraulic systems employed discrete electrical circuits which were designed to sense the position of control members, such as pedals or levers, and responsively produce control signals. The control signals in turn were applied to control valves and flow regulator means for regulating the flow of hydraulic fluid to drive motors and hydraulic implement cylinders. More recently, microprocessor based systems have essentially displaced systems employing discrete circuits. Microprocessors are advantageous over discrete circuits because they can readily be programmed to effect more complicated and precise control than can be achieved using discrete circuits.

However, in either type of electro-hydraulic system a fault in any component between the control members and the control valves can render the vehicle inoperable. For example, if a control valve which regulates flow to a digging implement fails during a digging cycle, the implement could become stuck in a position which renders vehicle travel impossible. In a second scenario it could be possible for an electrical fault to disable control of a hydraulic drive motor. In either situation, the vehicle will be stranded at the job site making repair difficult and time consuming.

The present invention is directed to overcoming the problems as set forth above.

DISCLOSURE OF THE INVENTION

In a first aspect of the present invention, a control system is provided for use with a hydraulic system which includes a source of pressurized fluid, a plurality of actuators, and a plurality of fluidly powered components. Each flow regulator means is adapted to receive the pressurized fluid and is responsive to a respective control signal for regulating the flow of pressurized fluid to respective fluidly powered components. The control system includes a plurality of control members, each being movable to a plurality of locations for indicating a desired fluid output for a respective flow regulator means. A plurality of sensors are provided for sensing the position of respective control members and responsively producing respective position signals. A primary controller is adapted to receive the position signals, process the received signals to responsively produce the control signals, and deliver the control signals to the flow regulator means. A secondary controller is normally disabled and is adapted to receive the position signals, process the position signals to responsively produce the control signals, and deliver the control signals to the flow regulator means. A first device is provided for controllably disabling the primary controller and enabling the secondary controller.

In a second aspect, a control system is provided for use with a hydraulic system which includes a source of pressurized fluid, a plurality of flow regulator means, and a plurality of fluidly powered components. Each flow regulator means is adapted to receive the pressurized fluid and is responsive to a respective control signal for regulating the flow of pressurized fluid to respective fluidly powered components. The control system includes a plurality of first control members, each being movable to a plurality of locations for indicating a desired fluid output for a respective flow regulator means. A plurality of first sensors are provided for sensing the position of respective first control member and responsively producing respective first position signals. A primary controller is adapted to receive the first position signals, process the first position signals to responsively produce the control signals, and deliver the control signals to the flow regulator means. The control system further includes a plurality of second control members, each of which is movable to a plurality of locations for indicating a desired fluid output for a respective flow regulator means. A plurality of second sensors are provided for sensing the position of respective second control members and responsively producing respective second position signals. A secondary controller is normally disabled and is adapted to receive the second position signals, process the second position signals to responsively produce the control signals, and deliver the control signals to the flow regulator means. A first device is provided for controllably disabling the primary controller and enabling the secondary controller.

BRIEF DESCRIPTION OF THE DRAWINGS

FIGS. 2A-B are schematic drawings of a second embodiment of the present invention.

BEST MODE FOR CARRYING OUT THE INVENTION

Figure 1A:
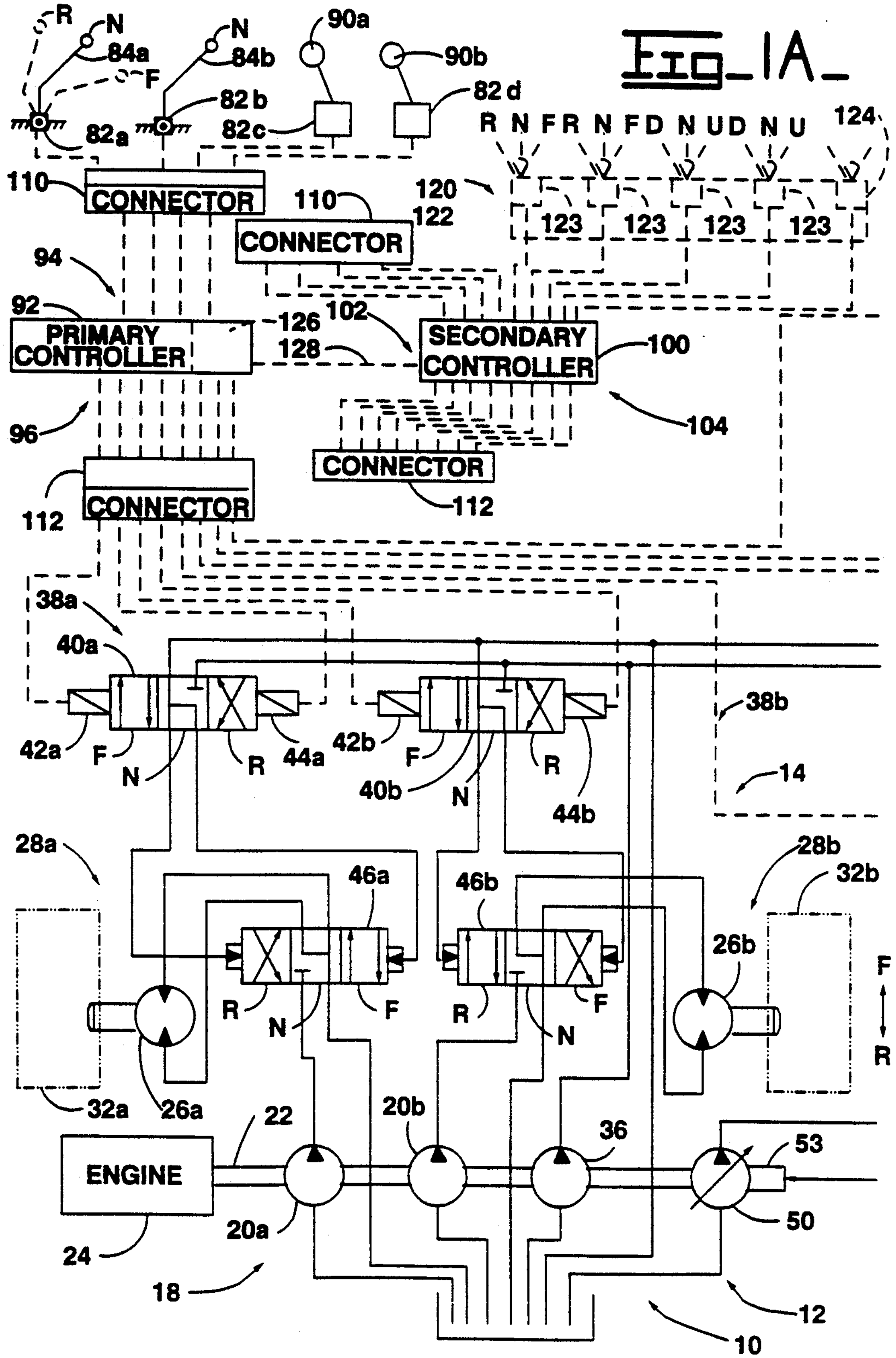
FIGS. 1A-B are schematic drawings of a first embodiment of the present invention.
Figure 1B:
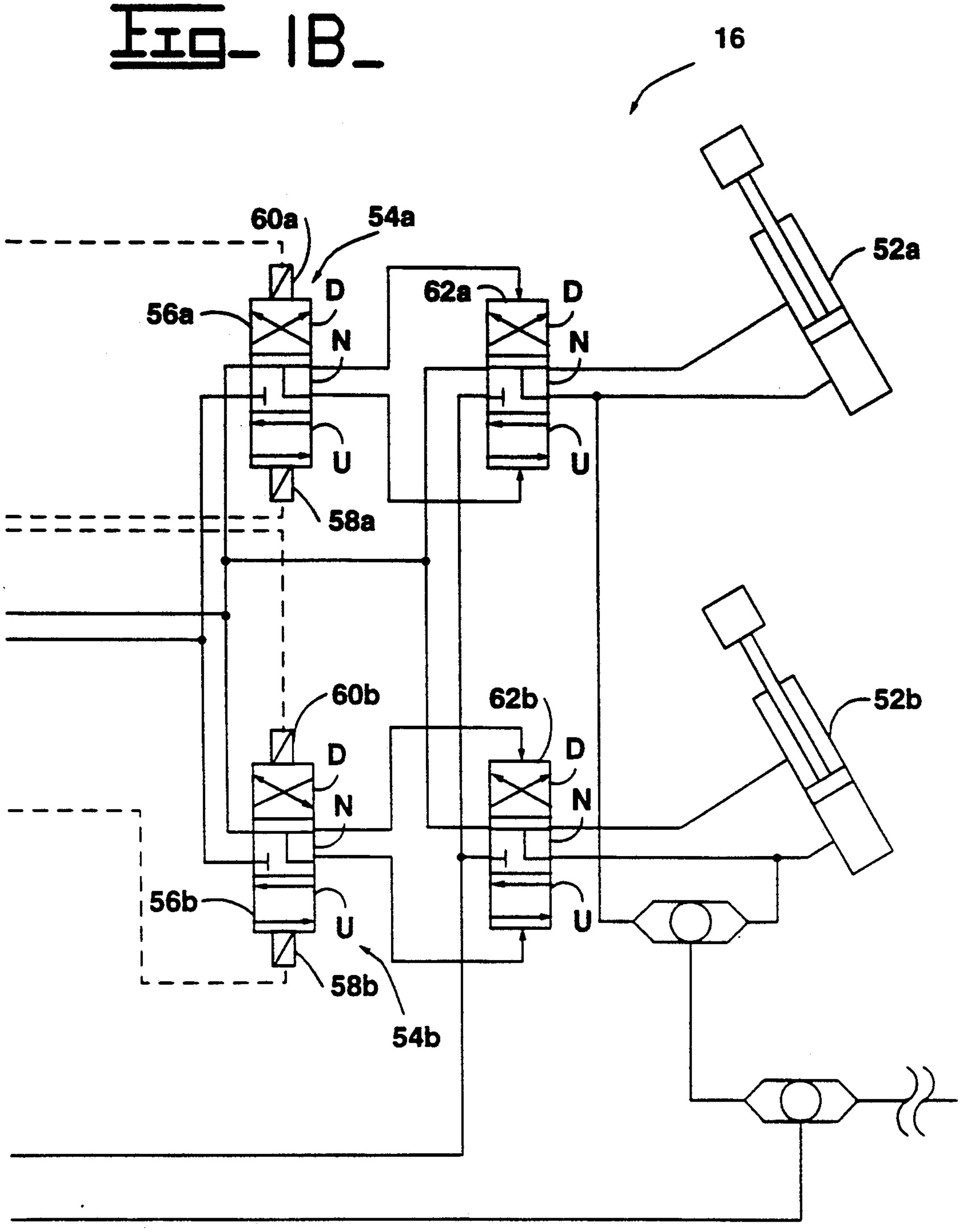

Referring now to FIGS. 1A-B, a first embodiment of the present invention will be discussed. The present invention is a control system 10 for use in a vehicle equipped with a hydraulic system 12. In the FIGS. 1A-B, the hydraulic system 12 is shown as including a drive system 14 and an implement system 16. While the invention is described in connection with the drive and implement systems 14, 16 illustrated in FIG. 1A-B, it is to be understood that the present invention can readily be adapted for use in other hydraulic systems.

The drive system 14 includes a source of pressurized fluid 18. Preferably, the source of pressurized fluid 18 includes first and second fluid pumps 20*a,b*. While the pumps 20*a,b* are illustrated as having a fixed displacement, variable displacement pumps could also be utilized, as would be apparent to one skilled in the art. The pumps 20*a,b* are mechanically connected to an output shaft 22 of an engine 24 for rotation therewith. The speed of the engine 24 is regulated by an engine controller (not shown) in a manner well known in the art. Because the engine controller forms no part of the present invention, it is not further described.

The pumps 20a,b are adapted to provides pressurized fluid to first and second hydraulic drive motors 26a,b through hydraulic circuits 28a,b. The drive system 14 further includes first and second ground engaging devices 32a,b, such as tracks or wheel, which are connected to and driven by respective drive motors 26a,b. The ground engaging devices 32a,b are adapted to propel the vehicle at a speed and direction responsive to the speeds and directions of the motors 26a,b.

A pilot pump 36 is mechanically connected to the engine output shaft 22 for rotation therewith. The pilot pump 36 is adapted to provide pressurized fluid at a rate responsive to engine speed, as would be apparent to one skilled in the art.

First and second motor flow regulator means 38a,b are adapted to receive first and second motor control signals and responsively control the rate and direction of fluid flow to the first and second drive motors 26a,b, respectively. The motor flow regulator means 38a,b each include a pilot valve 40a,b which is hydraulically connected to the pilot pump 36 and adapted to receive a pilot pressure from the pump 36. The pilot valves 40a,b are three-position, electro-hydraulic proportional valves. Each valve 40 has a forward (F), reverse (R) and neutral (N) position. The direction terms as used herein are for illustration purposes only and are not to be construed as limiting the present invention. The pilot valves 40a,b are adapted operate on the pilot pressure to provide motor control pressure which is responsive to the magnitude of a respective motor control signal.

Each pilot valve 40 includes a forward solenoid 42 and a reverse solenoid 44 for controlling the direction and displacement of a respective pilot valve 40. Hence, the motor control signals each consist of forward and reverse signals which are controllably delivered to respective forward and reverse solenoids 42,44. It should be apparent that forward and reverse signals are not simultaneously delivered to a pilot valve 40 at the same time.

Application of a motor control signal to one of the forward or reverse solenoid 42,44 causes a proportional displacement of a respective pilot valve 40 in the same direction. The pilot valve 40 operates on the pilot pressure to produce control pressure which is responsive to the received control signal. The magnitude and direction of the control pressure is controlled by the degree and direction the pilot valve 40 is displaced from the neutral position.

Each flow regulator means 38a,b further includes a pilot actuated directional valve 46a,b. The directional valves 46a,b are hydraulically connected between the pumps 20a,b and the drive motors 26a,b. The directional valves 46a,b are three-position, pilot-actuated proportional valves. Each valve 46 has a forward position (F), a neutral position (N) and a reverse position (R). The directional valves 46a,b are adapted to receive a motor control pressure from a respective pilot valve 40a,b and responsively control the direction and rate of fluid flow to a respective drive motor 26a,b, as would be apparent to one skilled in the art.

As was mentioned above, the hydraulic system 12 also includes an implement system 16. The implement system 16 includes an implement pump 50 which is adapted to provide pressurized fluid to a plurality of hydraulically actuated implements 52 (two shown). The implement pump 50 is mechanically connected to the engine output shaft 22 for rotation therewith. The implement pump 50 is a variable displacement pump, wherein pump output is a function of the greatest demand required by any one implement. A pump controller 53 is provided for controlling displacement of the pump 52, as is common in the art.

A plurality of implement flow regulator means 54a,b, are adapted to receive respective implement control signals and control the direction and rate of fluid flow to respective implements 52a,b. Each implement flow regulator means 54 includes a three-position electro-hydraulic pilot valve 56 which is similar to those used in the drive system 14. The pilot valves 56 are hydraulically connected to the pilot pump 36 and adapted to receive an implement pilot pressure therefrom. The pilot valves 56a,b are adapted to operate on the implement pilot pressure to provide an implement control pressure which is responsive to the magnitude of a respective implement control signal.

Each pilot valve 56 includes an up solenoid 58 and a down solenoid 60 for controlling the direction and displacement of a respective pilot valve 56. Again, these directional terms are purely illustrative and should not be construed as limitations on the present invention. Hence, the implement control signals each consist of an up and down signal which are controllably delivered to respective up and down solenoids 58,60. The pilot valves 56a,b operate as explained above to produce a respective implement control pressures. It should be apparent that up and down signals are not simultaneously delivered to a single implement pilot valve 56.

Each implement flow regulator means 54 further includes a pilot actuated directional valve 62a,b. The directional valves 62a,b are hydraulically connected between the implement pump 50 and the hydraulically actuated implements 52a,b. The directional valves 62a,b are three-position, pilot-actuated proportional valves which are similar to those employed in the drive system 14. Each valve 62 has an up (U), a down (D) and a neutral position (N). The directional valves 62a,b are adapted to received a pilot pressure from a respective pilot valve 56a,b and responsively control the rate and direction of fluid flow to a respective implement 52a,b, as is common in the art.

The control system 10 includes a plurality of first control members, 84a,b, 90a,b each of which is positionable at a plurality of locations for indicating a desired fluid output for one or more of the fluid flow regulator means 38,54. First position sensors 82 are provided for sensing the position of respective ones of the first control members 84,90 and producing respective first position signals.

In the preferred embodiment, the first control members include first and second motor control members 84a,b, each being positionable at a plurality of locations for indicating a desired speed and direction for a respective drive motor 26a,b. More specifically, the motor control members 84a,b are manually movable between first and second positions. (F),(R) which correspond respectively to full speed forward and full speed reverse. In the absence of external force, the control members are biased to an intermediate position (N) corresponding to neutral. The motor control members 84a,b are illustrated as hand-operated control levers; however, typically, foot-operated control pedals (not shown) are integrally connected with the control levers so that the vehicle can be controlled by either the control levers or the foot pedals.

Position sensor 82*a,b* are provided for sensing the positions of the motor control members 84*a,b* and producing first and second desired speed/direction signals in response thereto. Preferably, the position sensors 82*a,b* are in the form of potentiometers which produce output signals having magnitudes responsive to the positions of the control members 30*a,b*. Such sensors are well known in the art and will not be explained in detail herein. A suitable rotary potentiometer is disclosed U.S. Pat. No. 4,915,075 which issued to Brown and is assigned to the assignee herein.

Alternatively, the a single control member (not shown) could be employed for indicating a desired speed and direction of travel for the vehicle. A position sensor is required to produce a signal responsive to the position of the control member. If a single lever is employed, the position signal will correspond to a desired speed and direction.

The first control members also include a plurality of implement control members 90*a,b* (two shown) in the form of hand-operated levers. The implement control levers (U),(D) are movable between first and second locations corresponding respectively to full speed up and full speed down. In the absence of external force, the implement control members 90 are normally biased to an intermediate position (N) corresponding to no implement movement. A first position sensor 82*c,d* is provided for each implement control member 90. The position sensors 82*c,d* are adapted to sense the position of a respective implement control member 90*a,b* and produce a first desired implement position signal.

A primary controller 92 has an input 94 connectable to the first position sensors 82*a–d* and adapted to receive the position signals. The primary controller 92 is adapted to process the received signals to responsively produce the motor and implement control signals. Preferably, the primary controller 92 is implemented employing a microprocessor with appropriate input and output signal conditioning circuits (not shown) as is well known in the art. Numerous commercially available devices are readily adaptable for performing the functions of the primary controller 92. One suitable device is a series M68000 microprocessor as manufactured by Motorola Semiconductor Products, Inc. of Phoenix, Ariz.

The microprocessor operates under software control for processing the received signals to produce the motor and implement control signals. Since implement and motor control systems of this type are well known in the art, no further description is given. Moreover, it is to be understood, that the present invention can readily be adapted for use with a variety of such systems. The primary controller 92 further has an output 96 which is connectable to the motor and implement flow regulator means 38,54 and adapted to deliver the control signals to the flow regulator means 38,54 for controlling operation of the motors 26 and implements 52, as was explained above.

A secondary controller 100 is normally disabled and has an input 102 which is connectable to the position sensors 82*a–d* and adapted to receive the position signals. The secondary controller 100 is adapted to process the received signals to responsively produce the implement and motor control signals. The secondary controller 100 can be embodied in a microprocessor identical to that used for the primary controller 92. Alternatively, the secondary controller 100 can be embodied in the form of a discrete electrical circuit which is designed to receive the position signals from the position sensor 82 and responsively produce the control signals. Using a discrete circuit is felt to be preferable because such a circuit is cheaper than employing an additional microprocessor.

Preferably, the secondary controller 100 is designed to limit the control signals to a preselected percentage of their maximum, such as 30%. In this manner, the speeds of drive motors 26 and vehicle implements 52 are similarly limited to a preselected percentage of their maximums. By limiting vehicle performance in this manner, the operator will be encouraged to have the vehicle serviced. Programming a microprocessor or designing a discrete circuit to limit the control signals is a mere mechanical step for one skilled in the art; therefore, no further description is provided.

The control system 10 includes a first means for controllably disabling the primary controller 92 and enabling the secondary controller 100. More specifically, the secondary controller 100 is normally disabled from producing the control signals. The first means is provided for enabling the secondary controller 100 to produce the control signals and stop the primary controller 92 from producing the control signals in the event that there is a failure in the primary controller 92.

In the first embodiment, the first means includes a first connector 110 which is adapted to controllably connect the input 94,102 of either controller 92,100 to the first position sensors 82. Preferably the first connector 110 is in the form of a single harness-type connector (see FIG. 1) which is adapted to connect all of the position sensors 82 to the input 94,102 of either controller 92,100. Alternatively, the first connector 110 could be embodied in plurality of individual connectors (not shown) for controllably connecting a respective position sensor 82 to the input 94,102 of either controller 92,100.

The first means also includes a second connector 112 adapted to controllably connect the output 96,104 of either controller 92,100 to the flow regulator means 38,54. Again, the second connector 112 is preferably embodied in the form of a single harness-type connector (see FIG. 1) which is adapted to connect all of the flow regulator means 38,54 to the output 96,104 of either controller 92,100. The second connector 112 can also be embodied in a plurality of individual connectors (not shown) for controllably connecting a respective flow regulator means 38,54 to either of the controllers outputs 96,104.

This first embodiment has the advantage of allowing the second controller 100 to be in the form of a device which is portable and can be removed from the vehicle. Hence, one second controller 100 can be used on any one of a plurality of work vehicles.

The control system includes a plurality of second control members 120 and respective position sensors 122 for sensing the positions of second control member 120 and responsively producing respective second position signals. Preferably, the second control members 120 and positions sensors 122 are in the form of three-position switches 123, each being normally biased to a center position which corresponds to neutral or no hydraulic flow. For the hydraulic system shown in FIG. 1, four such switches 123*a–d* are provided, two switches 123*a,b* are adapted for controlling the first and second drive motors 26*a,b* and two switches are provided for controlling the first and second implements 52*a,b*. The switches 123*a–d* are permanently connected to the second controller input 102 and adapted to deliver the second position signals thereto.

A selector switch 124 is provided for enabling the operator to select between the first and second control members. The selector switch 124 is a two-position switch and is adapted to produce a selector signal in one of the positions. The secondary controller 100 is connected to the selector switch 124 and adapted to receive the selector signal. The secondary controller 100 is adapted to process the selector signal to produce the control signals when the selector signal is received. Conversely, if no selector signal is received, the secondary controller 100 is adapted to process the first position signals to produce the control signals.

It is conceivable that it might be desirable to allow full power when the first control members are used and to limit hydraulic power when the second control members are used. This can be accomplished by adapting the secondary controller 100 to limit the magnitude of the control signals to a preselected percentage of their maximum if the selector signal is received and to allow the maximum values if the selector signal is not received, for example.

Figure 2B:
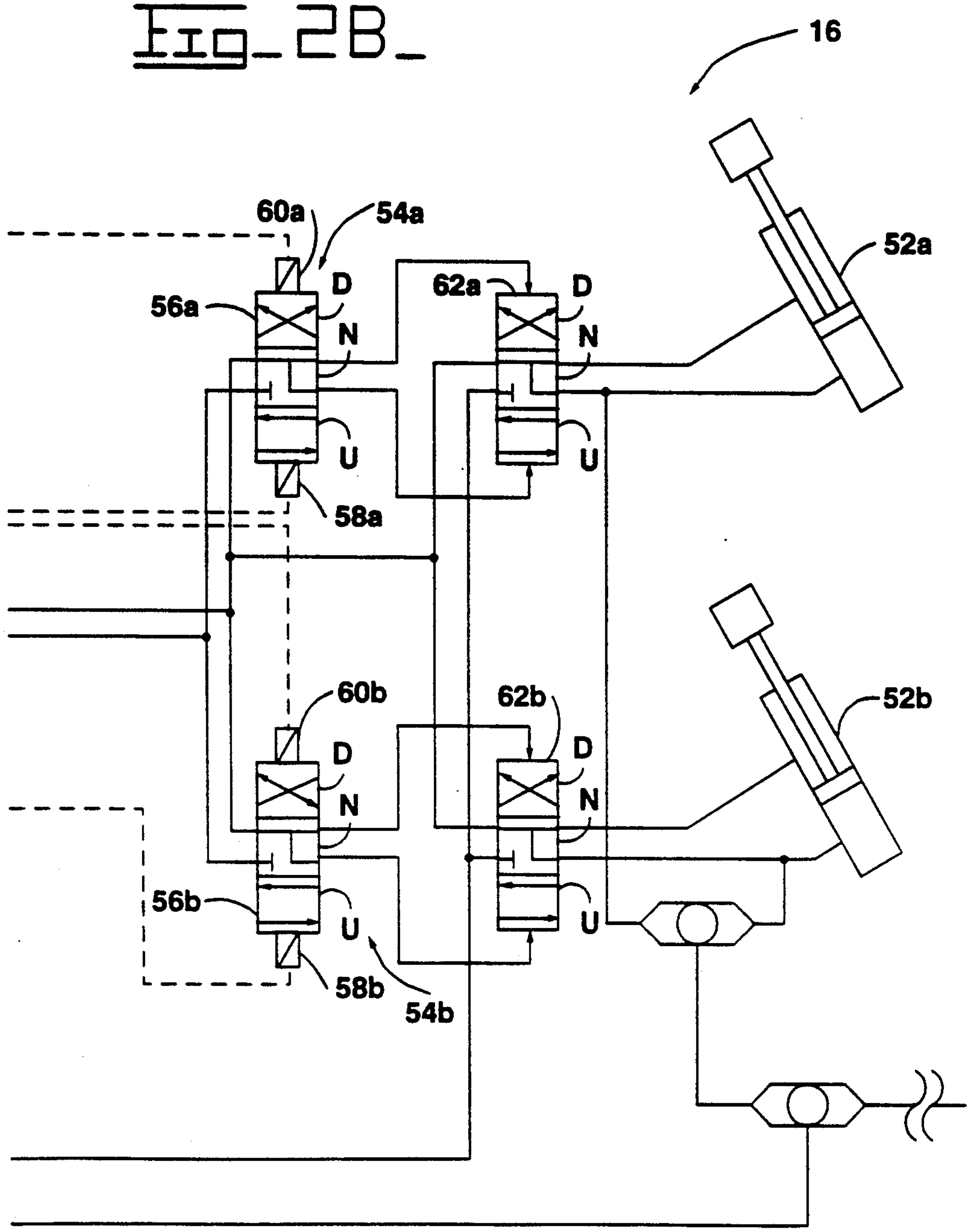

Referring now to FIGS. 2A–B, a second embodiment of the present invention is described. Much of FIGS. 2A–B are identical to FIGS. 1A–B and like parts have been similarly numbered. The main difference between the first and second embodiments is that the second embodiment does not include the first and second connectors 110,112. Rather, the second controller 100 is permanently connected to the first position sensor 82 and the flow regulator means 38,54.

In the second embodiment, the first means includes a diagnostic means 126 for detecting operating faults in the control system 10. The diagnostic means 126 and primary controller 92 can be embodied in a single microprocessor or, alternatively, the diagnostic means 126 and primary controller 92 can be embodied in separate microprocessors adapted to communicate via a data link, for example. Using separate microprocessor is less desirable from a cost standpoint; however, it is more desirable from a performance and reliability standpoint.

The diagnostic means 126 is programmed to detect operating faults in the control system 10 and responsively disable the primary controller 92 and enable the secondary controller 100 in the event. More specifically, the diagnostic means 126 is adapted to sense faults, such as failed sensors, electrical faults, and faults in the primary controller 92 and responsively produce fault signals. Diagnostic devices of this type are well known in the art; therefore, no further description of the diagnostic means 126 is provided herein. The primary controller 92 is adapted to receive the fault signals and responsively stop delivery of the control signals to the flow regulator means 38,54. Conversely, the secondary controller 100 is adapted to receive the fault signals and responsively start delivery of the control signals to the flow regulator means 38,54. A communications means 128, such as a data link, is provided for communicating the fault signals from the diagnostic means 126 to the secondary controller 100.

Industrial Applicability

Operation of the control system 10 is best understood in relation to its use on a vehicle, for example an excavator. Assuming initially that there are no malfunctions in the control system 10, the primary controller 92 will be operable for receiving the first position signals and responsively producing the control signals. Hence, the operator will use the first control members 84,90 to control movement of the vehicle as well as operation of the vehicle's implements.

In the event that a fault condition occurs, the secondary controller 100 can be activated to enable continued operation and control of the vehicle's hydraulic system 12. In the first embodiment, a fault will require the operator, or some other person, to manually disconnect the primary controller 92 from the first position sensors 82 and the flow regulator means 38,54 via the first and second connectors 110,112 respectively. The secondary controller 100 is then connected to the position sensors 82 and flow regulator means 38,54 using the first and second connectors 110,112, respectively.

In the second embodiment, the diagnostic means 126 is continuously operational for detecting operating faults in the control system 10. In the event that a fault is detected, the diagnostic means 126 produces a respective fault signal. The presence of a fault signal automatically switches control from the primary controller 92 to the secondary controller 100, as explained above.

In either embodiment, a set of second control members 120 can be accessed to control the vehicle in the event that the first control members 84, 90 are malfunctioning. The operator uses the selector switch 124 to select which control members (either the motor control members 83 and the implement control members 90, or the second control members 120) are used to control the vehicle.

By providing the immediate redundant control system, the vehicle can be moved to a better location for service. The hydraulic and electrical circuitry utilized in design of the present invention are conventional and are well known in the art. It is the unique application of these components that solves the problems set forth herein and forms the basis for the present invention.

Other objects, aspects and advantages can be obtained from a study of the drawings, the disclosure and the appended claims.

We claim:

1. A control system for use in a vehicle having a hydraulic system which includes a source of pressurized fluid, a plurality of flow regulator means, and a plurality of fluidly powered components, each flow regulator means being adapted to receive the pressurized fluid and being responsive to a respective control signal for regulating the flow of pressurized fluid to respective fluidly powered components, comprising:

a plurality of control members, each being movable to a plurality of locations for indicating a desired fluid output for a respective flow regulator means;

a plurality of sensors, each sensor being adapted to sense the position of a respective control member and responsively produce a position signal;

a primary controller having a input and an output, the input being connectable to the sensors and adapted to receive the position signals, the primary controller being adapted to process the position signals to responsively produce the control signals, and the output being connectable to the flow regulator means and adapted to deliver the control signals to the flow regulator means;

a secondary controller having an input and an output, the input being connectable to the sensors and adapted to receive the position signals, the secondary controller being adapted to process the position signals to responsively produce the control signals, the output being connectable to the flow regulator means and adapted to deliver the control signals to the flow regulator means, and wherein the second controller is normally disabled; and first means for controllably disabling the primary controller and enabling the secondary controller, said first means being free from addressing circuitry.

2. An apparatus as set forth in claim 1, wherein the first means includes a diagnostic means for detecting operating faults in the control system, and responsively disabling the primary controller and enabling the secondary controller.

3. An apparatus as set forth in claim 2, wherein the diagnostic means produces fault signals in response to detected operating faults, and wherein the primary controller is adapted to receive the fault signal and responsively stop delivery of the control signals to and the flow regulator means and the secondary controller is adapted to receive the fault signals and responsively start delivery of the control signals to the flow regulator means.

4. An apparatus as set forth in claim 3 including a microprocessor adapted to perform the functions of the first controller and the diagnostic means, and a communications means for delivering the fault signals from the microprocessor to the second controller.

5. An apparatus as set forth in claim 1, wherein the primary controller includes a microprocessor adapted to receive the position signals and produce the control signals.

6. An apparatus as set forth in claim 1, wherein the secondary controller includes a microprocessor adapted to receive the position signals and produce the control signals.

7. An apparatus as set forth in claim 1, wherein the secondary controller includes a discrete circuit adapted to receive the position signals and produce the control signals.

8. A control system for use in a vehicle having a hydraulic system which includes a source of pressurized fluid, a plurality of actuators, and a plurality of fluidly powered components, each actuator being adapted to receive the pressurized fluid and being responsive to a respective control signal for regulating the flow of pressurized fluid to respective fluidly powered components, comprising:

a plurality of control members, each being movable to a plurality of locations for indicating a desired fluid output for a respective actuator;

a plurality of sensors, each sensor being adapted to sense the position of a respective control member and responsively produce a position signal;

a primary controller having a input and an output, the input being connectable to the sensors and adapted to receive the position signals, the primary controller being adapted to process the position signals to responsively produce the control signals, and the output being connectable to the actuators and adapted to deliver the control signals to the actuators;

a secondary controller having an input and an output, the input being connectable to the sensors and adapted to receive the position signals, the secondary controller being adapted to process the position signals to responsively produce the control signals, the output being connectable to the actuators and adapted to deliver the control signals to the actuators, and wherein the second controller is normally disabled; and first means for controllably disabling the primary controller and enabling the secondary controller, wherein the first means includes a first connector means for controllably connecting the input of either controller to the sensors and a second connector means for controllably connecting the output of either controller to the actuators.

9. An apparatus as set forth in claim 8 wherein the first connector includes a plurality of first connectors, each first connector being adapted to controllably connect a respective sensor to the input of either controller, and wherein the second connector means includes a plurality of second connectors, each second connector being adapted to controllably connect a respective flow regulator means of the output of either controller.

10. An apparatus as set forth in claim 8, wherein the second controller is portable and can be removed from the vehicle.

11. A control system for use in a vehicle having a hydraulic system which includes a source of pressurized fluid, a plurality of actuators, and a plurality of fluidly powered components, each actuator being adapted to receive the pressurized fluid and being responsive to a respective control signal for regulating the flow of pressurized fluid to respective fluidly powered components, comprising:

a plurality of control members, each being movable to a plurality of locations for indicating a desired fluid output for a respective actuator;

a plurality of sensors, each sensor being adapted to sense the position of a respective control member and responsively produce a position signal;

a primary controller having a input and an output, the input being connectable to the sensors and adapted to receive the position signals, the primary controller being adapted to process the position signals to responsively produce the control signals, and the output being connectable to the actuators and adapted to deliver the control signals to the actuators;

a secondary controller having an input and an output, the input being connectable to the sensors and adapted to receive the position signals, the secondary controller being adapted to process the position signals to responsively produce the control signals, the output being connectable to the actuators and adapted to deliver the control signals to the actuators, and wherein the second controller is normally disabled; and first means for controllably disabling the primary controller and enabling the secondary controller, wherein the secondary controller limits the magnitude of the control signals to a preselected percentage of their maximum values.

12. A control system for use in a vehicle having a hydraulic system which includes a source of pressurized fluid, a plurality of flow regulator means, and a plurality of fluidly powered components, each flow regulator means being adapted to receive the pressurized fluid and being responsive to a respective control signal for regulating the flow of pressurized fluid to respective fluidly powered components, comprising:

a plurality of first control members, each being movable to a plurality of locations for indicating a desired fluid output for a respective flow regulator means;

a plurality of first sensors, each first sensor being adapted to sense the position of a respective first control member and responsively produce a first position signal;

a primary controller having a input and an output, the input being connectable to the first sensors and adapted to receive the first position signals, the controller being adapted to process the first position signals to responsively produce the control signals, and the output being connectable to the flow regulator means and adapted to deliver the control signals to the flow regulator means;

a plurality of second control members, each being movable to a plurality of locations for indicating a desired fluid output for a respective flow regulator means;

a plurality of second sensors, each second sensor being adapted to sense the position of a respective second control member and produce a second position signal responsive to the position of the control member;

a secondary controller having an input and an output, the input being connectable to the second sensors and adapted to receive the second position signals, the processor being adapted to process the second position signals to responsively produce the control signals, the output being connectable to the flow regulator means and adapted to deliver the control signals to the flow regulator means, and wherein the second controller is normally disabled; and first means for controllably disabling the primary controller and enabling the secondary controller.

13. An apparatus as set forth in claim 12, including a selector switch adapted to produce a selector signal, and wherein the secondary controller is connected to the selector switch and adapted to receive the selector signal, and wherein the secondary controller input is controllably connectable to the first sensors and adapted to receive the first position signals, and wherein the secondary controller is adapted to process the second signals to produce the control signals when the selector signal is received and process the first position signals when the selector signal is not received.

14. An apparatus as set forth in claim 13, wherein said second controller limits the magnitude of the control signals to a preselected percentage of their maximum if the selector signal is received.

15. An apparatus as set forth in claim 13, wherein the first means includes a first connector means for controllably connecting the input of either controller to the first sensors and a second connector means for controllably connecting the output of either controller to the flow regulator means.

16. An apparatus as set forth in claim 15 wherein the first connector includes a plurality of first connectors, each first connector being adapted to controllably connect a respective first sensor to the the input of either controller, and wherein the second connector means includes a plurality of second connectors, each second connector being adapted to controllably connect a respective flow regulator means of the output of either controllers.

17. An apparatus as set forth in claim 15, wherein the second controller is portable and can be removed from the vehicle.

18. An apparatus as set forth in claim 12, wherein the first means includes a diagnostic means for detecting operating faults in the control system, and responsively disabling the primary controller and enabling the secondary controller.

19. An apparatus as set forth in claim 18, wherein the diagnostic means produces fault signals in response to detected operating faults, and wherein the primary controller is adapted to receive the fault signal and responsively stop delivery of the control signals to the flow regulator means, and the secondary controller is adapted to receive the fault signals and responsively start delivery of the control signals to the flow regulator means.

20. An apparatus as set forth in claim 19 including a microprocessor adapted to perform the functions of the first controller and the diagnostic means, and a communications means for delivering the fault signals from the microprocessor to the second controller.

21. An apparatus as set forth in claim 12, wherein the second controller is portable and can be removed from the vehicle.

22. An apparatus as set forth in claim 12, wherein the secondary controller limits the magnitude of the control signals to a preselected percentage of their maximum values.

23. An apparatus as set forth in claim 12, wherein the primary controller includes a microprocessor adapted to receive the first position signals and produce the control signals.

24. An apparatus as set forth in claim 12, wherein the secondary controller includes a microprocessor adapted to receive the second position signals and produce the control signals.

25. An apparatus as set forth in claim 12, wherein the secondary controller includes a discrete circuit adapted to receive the second position signals and produce the control signals.

* * * * *

UNITED STATES PATENT AND TRADEMARK OFFICE
CERTIFICATE OF CORRECTION

PATENT NO. : 5,299,420

DATED : April 5, 1994

INVENTOR(S) : Lonnie J. Devier et al.

It is certified that error appears in the above-identified patent and that said Letters Patent is hereby corrected as shown below:

Column 9, claim 3, line 20, after "to", delete "and";

column 11, claim 12, line 7, after "having", delete "a" and insert --an--.

Signed and Sealed this

Twenty-eight Day of March, 1995

*Attest:*

Bruce Lehman

BRUCE LEHMAN

*Attesting Officer*

*Commissioner of Patents and Trademarks*